United States Patent
Stecyk

[11] Patent Number: 5,197,772
[45] Date of Patent: Mar. 30, 1993

[54] SHOVEL
[76] Inventor: John Stecyk, Box 335, Cobourg, Ontario, Canada, K9A 4K8
[21] Appl. No.: 792,585
[22] Filed: Nov. 15, 1991
[30] Foreign Application Priority Data
   Nov. 21, 1990 [CA] Canada ............................ 2030452-9
[51] Int. Cl.⁵ ............................. A01B 1/22; E01H 5/02
[52] U.S. Cl. ............................. 294/57; 37/285; 294/54.5
[58] Field of Search ............. 294/49, 51, 54.5, 55, 294/57-59; 16/110 R, 111 R, 111 A, 112; 37/130, 137, 264, 265, 278, 284, 285; 172/41, 42, 329, 350, 351, 353, 354, 358, 361, 370, 371

[56]  References Cited
   U.S. PATENT DOCUMENTS

| | | | |
|---|---|---|---|
| 2,460,560 | 2/1949 | Williams | 37/278 |
| 2,974,428 | 3/1961 | Krasner | 172/358 X |
| 3,024,547 | 3/1962 | Harrison | 294/54.5 X |
| 3,380,772 | 4/1968 | Lissakers | 294/54.5 X |
| 3,440,741 | 4/1969 | Yates | 294/54.5 X |
| 3,475,838 | 11/1969 | Hagen er al. | 294/54.5 X |
| 4,224,751 | 9/1980 | Schoemann et al. | 294/59 X |
| 4,878,704 | 11/1989 | Jacanin et al. | 294/54.5 |
| 5,048,883 | 9/1991 | Waluk | 294/54.5 |

FOREIGN PATENT DOCUMENTS

| | | | |
|---|---|---|---|
| 1088896 | 11/1980 | Canada | 294/54.5 |
| 73847 | 10/1944 | Czechoslovakia | 172/358 |

Primary Examiner—Johnny D. Cherry
Attorney, Agent, or Firm—Bereskin & Parr

[57]  ABSTRACT

A manually operable shovel in which the handle portion includes handle side parts spaced laterally apart to define a space between them in which the user's body may be located, the space being open at its end remote from the blade to allow the user to move into the space. Each side part includes a member adapted to underlie the user's arm from the user's hand to approximately the user's elbow. This permits the user to stand between the side parts with arms overlying the side parts and to apply a lifting force to lift the load in front of the user. The handle side parts then rotate with the arms of the user to provide a lever action and the user can apply a lifting force to the load in proximity to his/her body without bending his/her back. This manner of lifting reduces back strain.

11 Claims, 3 Drawing Sheets

SHOVEL

FIELD OF THE INVENTION

The present invention relates to a manually operable shovel and particularly to a novel shovel handle. The shovel of the present invention is useful for manually ploughing and lifting loose material, such as snow, and is particularly adapted for lifting such material in a manner which reduces back strain.

BACKGROUND OF THE INVENTION

It is known to provide a shovel having a U-shaped handle. Such handle has a pair of side members attached to opposite sides of a blade, and a handle bar extending between the ends of the side members remote from the blade. This configuration, which is disclosed in U.S. Pat. No. 4,669,206 to Yost and U.S. Pat. No. Des. 271,369 to Gesner, is well adapted for ploughing, scooping up and unloading material, but not for lifting such material. It is also known to provide a crossbar or handle to serve as a structural support and/or to provide a fulcrum for a lever action in order to facilitate lifting the material. U-shaped designs in which this feature is added are described in U.S. Pat. No. 321,326 to Waite and U.S. Pat. No. 3,136,574 to Pasquale. Pasquale discloses that the handle may be positioned to reduce bending and that the blade may be provided with cut out corners to minimize interference with the user's body. Waite discloses a crossbar/handle which is inaccessible to the user without bending. In both cases, the shovel is designed to be approached from the side and grasped conventionally with one hand below the other.

The prior art handles, such as those of Pasquale and Waite, permit the user to use only one hand (the lower hand), for controlling the load. This hand also provides a fulcrum for using the other hand (the upper hand) to provide a lever action to assist in lifting the load. This mode of handling involves a certain amount of bending and also distances the location of application of the support forces away from the axis of the user's back. This bending and distancing produces back strain. This mode of handling may also impose constraints on the size and/or shape of the blade due to considerations of load size and minimizing interference with the user's body. Furthermore, competing considerations come into play with respect to the position of the handle. To facilitate lifting, the handle must be positioned close to the load. On the other hand, to avoid back strain, the handle is preferably accessible without bending.

SUMMARY OF THE INVENTION

The handle of the present invention provides an improved arrangement for allowing a user to shovel snow while reducing back strain.

Accordingly, the present invention in one aspect provides a shovel having a blade, a handle portion and connecting means connecting said handle portion to said blade, said handle portion comprising two side parts spaced laterally apart to define a space between them in which the user's body may be located, said space being open at its end remote from the blade to allow a user to move into the space, each side part including a member adapted to underlie the user's arm from at least the user's elbow to the user's hand.

Further objects and advantages of the invention will appear from the following description, taken with the accompanying drawings.

DETAILED DESCRIPTION OF THE PREFERRED EMBODIMENT

Figure 1:
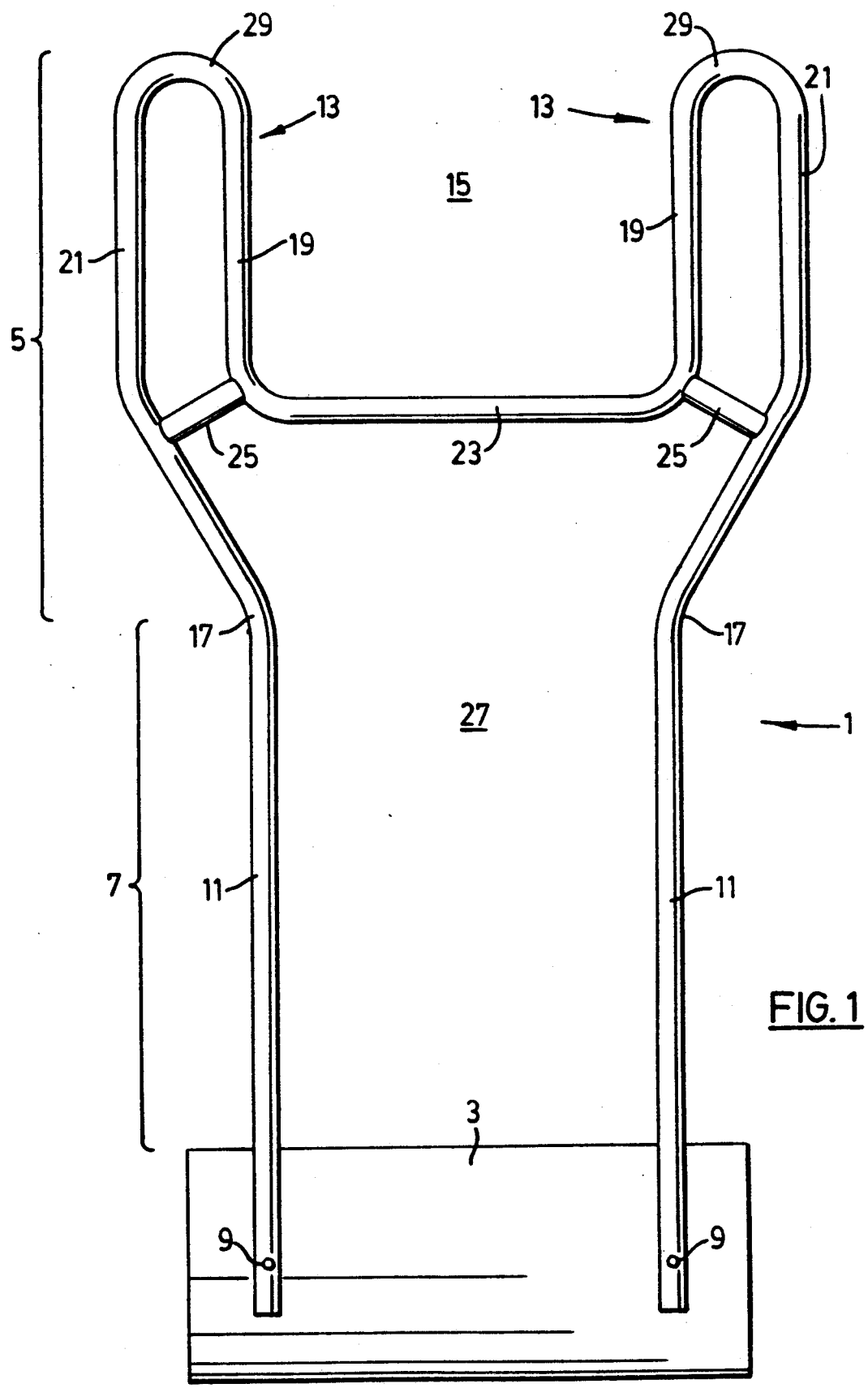
FIG. 1 is a back elevation of a preferred embodiment of a shovel according to the invention.

Reference is first made to FIG. 1, which shows a shovel 1 having a blade 3, a handle portion 5 and a connecting portion 7 connecting said handle portion 5 to said blade. The connecting portion 7 is connected to the blade 3 through matching holes in the connecting portion and blade using fasteners 9.

The handle portion 5 and connecting portion 7 may be formed from any material of suitable weight, strength and resilience. Metal tubing, e.g. aluminum, is preferred because it can be easily shaped and welded. However, a suitably strong plastic tubing can also be used. The handle portion 5 and connecting portion 7 may be shaped from a single section of metal tubing or may be welded together from suitably shaped segments of tubing.

The blade 3 may be formed in a suitable concave shape from any material of suitable weight, strength and resilience. Suitable materials may include steel, aluminum and plastics such as high impact polystyrenes and polyolefins or structural foam plastic.

The connecting portion 7 comprises two parallel connecting members or tubes 11 which are spaced laterally apart and connected to opposite sides of the blade 3. When the shovel 1 is held at a suitable angle for ploughing and lifting, these connecting members extend rearwardly from the blade.

The handle portion 5 comprises two handle side parts 13 spaced laterally apart to define a space 15 between them in which a user's body may be located. The space 15 is open at its end remote from the blade 3 to allow a user to move into the space 15.

Each handle side part 13 includes an angled portion 17, which portions converge inwardly towards each other to join the respective connecting members 11. The angled portions 17 serve as convenient positions for the user to grasp the handle portion, particularly during the lifting operation, which is described in detail with reference to FIG. 4. Accordingly, the handle side parts 13 are spaced laterally further apart than are the connecting members 11. (This relationship may vary depending on the size of the model constructed.) This serves to ensure that the space 15 between the handle side parts 13 accommodates the body size of most users, depending on the size of the model constructed.

Each handle side part 13 comprises an inner tube 19 and an outer tube 21 spaced laterally apart and extending parallel to each other. Either or both of these tubes, depending on the distance between them, may serve as a suitable member to underlie a user's arm from the user's hand to approximately the user's elbow.

The shovel 1 will usually include a cross member 23 joining together two inner tubes 19. In addition to serving as a structural support, the user may push against the cross member 23 with his hands or body to assist in a ploughing motion. In addition, the cross member 23 is useful to assist in a lifting motion as discussed with reference to FIG. 4.

Each handle side part 13 may also include a diagonal brace 25 extending between the inner and outer tubes 19, 21 adjacent to the location where the outer tubes 21 join their associated connecting member 11. The brace 25 may also serve as a handle to lift the shovel in the manner described with reference to FIG. 4.

The diagonal braces 25, cross member 23, angled portions 17, and connecting members 11, define a space 27 through which the user may extend his/her knee, as is discussed below with reference to FIG. 4.

The inner and outer tubes 19, 21 of each side part 13 may be joined at their ends remote from the blade by outwardly curved tubing portions 29. The outwardly curved tubing portions 29 serve as suitable handles for grasping the shovel when ploughing.

Figure 2:
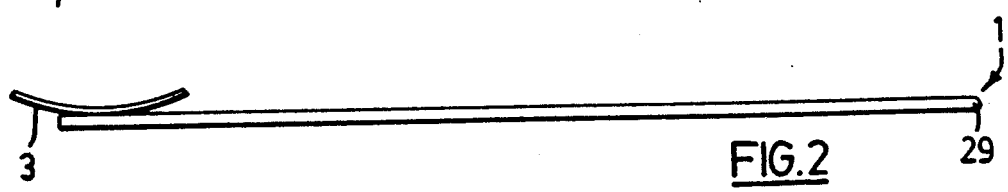
FIG. 2 is a side elevation of the shovel of FIG. 1.

As illustrated in FIG. 2, the connecting portion 7 extends rearwardly from the blade 3 and the handle portion 5 extends rearwardly from the connecting portion 7. The connecting portion 7 and handle portion 5 are coplanar.

Figure 3:
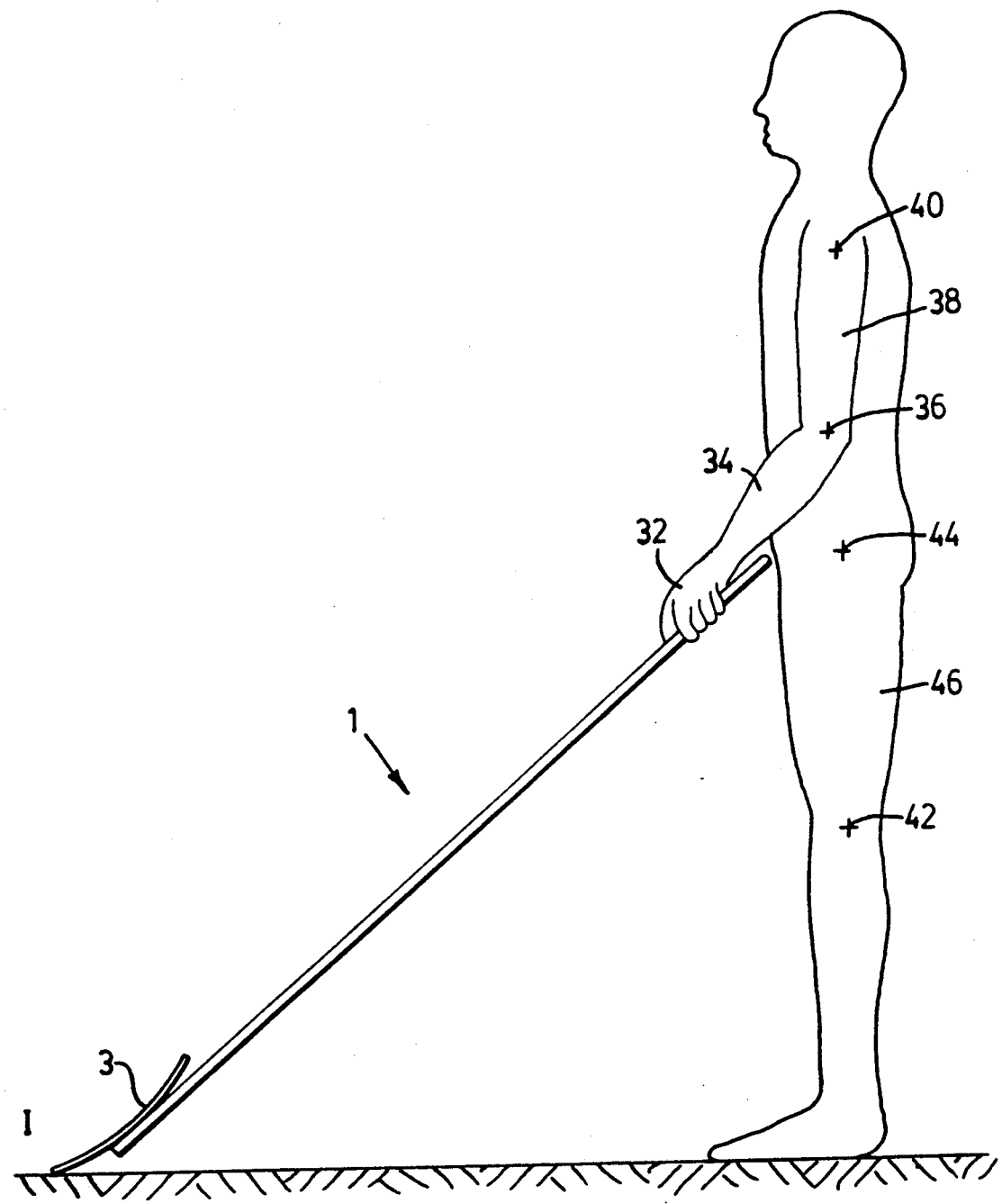
FIG. 3 is a side view of a user holding the shovel of FIG. 1 in a resting position. This view illustrates the position of the shovel and the user's arms, legs and back in the resting position.

As illustrated in FIG. 3, the shovel is at rest in position I and the user's body is interposed between the handle side parts 13. The user's hands 32 grip the angled portions 17. The user's arms overlie the handle side parts 13. In this position, the user's arms do not necessarily rest on the side part 13, as illustrated.

Figure 4:
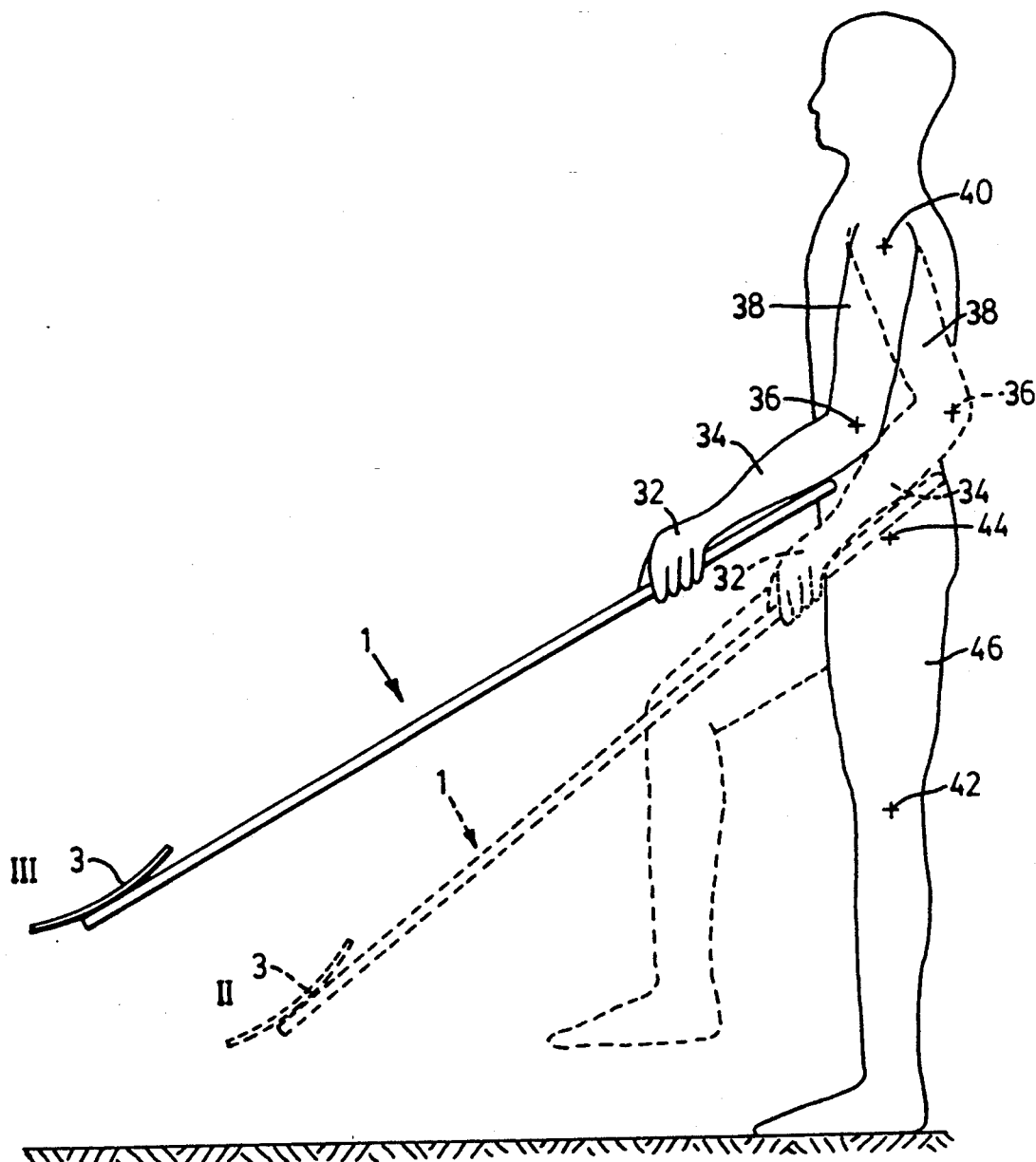
FIG. 4 is a side view of a user lifting the shovel of FIG. 1. This view illustrates the position of the shovel and the user's arms, legs and back during successive stages of a lifting motion.

As illustrated in FIG. 4, from the rest position I, the shovel may be progressively lifted through positions II and III. When the shovel 1 is raised into position II, the handle side parts 13 rotate about the hands 32 and swing into position underlying the forearms 34, the hands 32 acting as a fulcrum. From this position the handle side parts 13 may be rotated together with the forearms 34 about the elbow 36, the elbow 36 acting as a moving pivot point. The shovel functions as a multi-class lever throughout the various movements that occur during use.

To arrive at position II, the upper arms 38 may be rotated rearwardly about the shoulders 40 and the forearms 34 may also be rotated upwardly about the elbow 36. By rotating the upper arms 38 rearwardly, the locus of application of the lifting forces is close to the axis of the user's back, particularly when the lifting force is first applied to rotate the upper arms 38 backward.

Part of the lifting force may also be applied by rotating the user's knee 42 forward about the hip 44 through space 27 to bring the thigh 46 up against the cross member 23, as illustrated by the position of the leg shown in broken lines.

A lifting motion may also be achieved by simply rotating the forearms 34 upwardly with or without the aid of the thigh 46.

To provide further lift and to unload, the shovel 1 may be lifted into position III. It is preferable to gain a forward momentum when lifting the shovel into position III, as by stepping forward. By using a forward momentum, the user may minimize the duration of application and degree of lifting force required to be exerted in front of the axis of the user's back. This momentum coupled with a quick rearward motion of the upper arms 38 may also provide a horizontal force to disengage the snow. However, leg use is not essential.

Particularly when the user is required to lift a heavy load, e.g. wet snow, and further lift beyond position II is not required, an alternative unloading motion may be accomplished by stepping forward, resting the shovel on a bank of snow and tilting the shovel.

The shovel can also be used to lift very heavy loads in position I without rotating the forearms 34 on the upper arms 38. This is achieved by causing the user's body to lean slightly backward with hands 32 placed as shown in FIG. 3. Then, the elbows 36 can transfer leaning body weight downwardly to cause the shovel to act as a first class lever. The hands 32 act as the fulcrum, while the blade 3 supports and moves the load upwardly and the elbows 36 impart a downward force made possible by the body leaning backward.

If the shovel is used to lift very light loads (e.g. dry wood chips), the shovel may contain a bend, e.g. by angling the connecting portion 7 with respect to the handle portion 5 by (for example) three degrees. The bend would be forward and would allow the user to increase the velocity of the material shovelled.

I claim:

1. A shovel having a blade, a handle portion and connecting means connecting said handle portion to said blade, said handle portion comprising two side parts spaced laterally apart to define a space between them in which a user's body may be located, said side parts defining an opening into said space at an end of said handle portion remote from said blade to allow a user to move into said space, each side part including two members spaced laterally apart and extending parallel to each other and being adapted to underlie a user's arm from at least the user's elbow to the user's hand.

2. A shovel according to claim 1, wherein said connecting means comprise two connecting members spaced laterally apart and extending rearwardly from said blade, and wherein said side parts are spaced laterally further apart than are said connecting members.

3. A shovel according to claim 2, wherein said side parts include angled portions which converge inwardly toward each other to join said connecting members.

4. A shovel according to claim 1, 2 or 3 wherein said handle portion and said connecting means are formed from tubing.

5. A shovel according to claim 1, 2 or 3 wherein said handle portion and said connecting means are coplanar.

6. A shovel according to claim 2, wherein said connecting members are parallel.

7. A shovel according to claim 1, wherein each side part comprises an inner member and an outer member spaced laterally apart and extending parallel to each other, said shovel including a cross member joining said inner members.

8. A shovel according to claim 7, wherein said connecting means comprise two connecting members spaced laterally apart and extending rearwardly from said blade, each outer member joining a respective connecting member, and wherein each side part includes a diagonal brace extending between said inner and outer members adjacent the location where said outer member joins the respective connecting member.

9. A shovel according to claim 7 or 8, wherein each of said inner and outer members has an end remote from said blade, said ends on each side part being joined by an outwardly curved portion.

10. A shovel according to claim 7, wherein said handle portion, said connecting means and said cross member are coplanar.

11. A shovel according to claim 1, wherein the side parts are parallel to one another.

* * * * *